United States Patent [19]
DeGrand

[11] Patent Number: 5,985,390
[45] Date of Patent: *Nov. 16, 1999

[54] MULTILAYER FILMS WHICH CAN BE WELDED BY HIGH FREQUENCY

[75] Inventor: Michel DeGrand, Bernay, France

[73] Assignee: Elf Atochem S.A., France

[ * ] Notice: This patent issued on a continued prosecution application filed under 37 CFR 1.53(d), and is subject to the twenty year patent term provisions of 35 U.S.C. 154(a)(2).

[21] Appl. No.: 08/855,367

[22] Filed: May 13, 1997

[30] Foreign Application Priority Data

May 14, 1998 [FR] France .................................. 96 05998

[51] Int. Cl.$^6$ .................................................. B29D 22/00
[52] U.S. Cl. .................... 428/36.6; 428/36.7; 428/474.4; 428/475.8; 428/475.5; 428/522; 428/520
[58] Field of Search .............................. 428/474.4, 475.8, 428/475.5, 36.6, 36.7, 522, 520

[56] References Cited

U.S. PATENT DOCUMENTS

| | | | |
|---|---|---|---|
| 4,758,463 | 7/1988 | Vicik et al. | 428/216 |
| 5,070,145 | 12/1991 | Guerdoux | 525/179 |
| 5,135,785 | 8/1992 | Millon | 428/35.2 |
| 5,342,886 | 8/1994 | Glotin et al. | 525/66 |

FOREIGN PATENT DOCUMENTS

| | | |
|---|---|---|
| 2147330 | 10/1995 | Canada . |
| 095150 | 11/1983 | European Pat. Off. . |
| 273337 | 7/1988 | European Pat. Off. . |
| 342066 | 11/1989 | European Pat. Off. . |
| 0477025 | 3/1991 | European Pat. Off. . |
| 477025 | 3/1992 | European Pat. Off. . |
| 564338 | 10/1993 | European Pat. Off. . |
| 620244 | 10/1994 | European Pat. Off. . |
| 622182 | 11/1994 | European Pat. Off. . |
| 2291225 | 6/1976 | France . |
| 19513890 | 10/1995 | Germany . |

*Primary Examiner*—Leszek Kiliman
*Attorney, Agent, or Firm*—Bell, Boyd & Lloyd

[57] ABSTRACT

The invention relates to a multilayer film, which is useful for making flexible sachets, comprising (i) a barrier film based on a mixture of polyamide and of polyolefin, and (ii), on at least one of its faces, a film based on a copolymer of ethylene and of an unsaturated ester, which can be welded by high frequency.

The invention is useful for making flexible sachets of detergents, of bleach or of textile softeners.

6 Claims, No Drawings

MULTILAYER FILMS WHICH CAN BE WELDED BY HIGH FREQUENCY

FIELD OF THE INVENTION

The present invention relates to multilayer films and more particularly to the films used to make flexible sachets for household liquids such as washing-up detergent, laundry detergent, bleach or textile softeners.

BACKGROUND OF THE INVENTION

U.S. Pat. No. 5,135,785 describes films consisting of a polyethylene or polypropylene layer between two layers of an ethylene/vinyl acetate (EVA) copolymer containing at least 18% by weight of acetate. These films may be welded to make flexible sachets. These films have a permeability to oxygen; indeed, when the sachets contain concentrated bleach, decomposition of the bleach takes place over time with evolution of oxygen. If this oxygen is not released, the flexible sachet may split. These films are also permeable to fragrances. The prior art presents this loss of fragrances to the outside of the sachet as being necessary to allow the user to identify the product in the flexible sachet.

The loss of fragrance should not exceed 15% in 90 days of storage of the sachet. This is all merely a desired situation, the prior art includes no examples. Indeed the Applicant has found that the loss of fragrance was such that after 30 days the sachet no longer had any odour, although it originally contained large amounts of fragrance. The EVA must also contain slip agents, but exactly which they are is not stated and the film can only be welded within a period of from 4 to 20 weeks of its manufacture.

EP 477,025 has also described such multilayers, which consist of a polymer barrier between two layers of EVA or of ethylene/alkyl (meth)acrylate copolymer. The polymer barrier may be a linear low-density polyethylene (LLDPE), a polyamide-polyethylene (PE) bilayer, an EVOH-polyethylene bilayer and preferably a polyamide or an EVOH between two layers of polyethylene (EVOH denotes a copolymer of ethylene and of vinyl alcohol, also known as hydrolysed EVA); that is to say that the films of the prior art may consist, for example, of the following layers:

EVA/PE/PA/PE/EVA or EVA/PE/EVOH/PE/EVA

Furthermore, between the PE and the PA, as between the EVOH and the PE, it is necessary to place a coextrusion binder or to introduce into the PE, the EVOH or the PA, a polymer having reactive groups in order to facilitate the adhesion of the various layers. Sachets manufactured with these multilayers are permeable to oxygen, and are therefore suitable for bleach.

DESCRIPTION OF THE INVENTION

However, the barrier to fragrances or to odours of the transported products is insufficient. Applicant has now found a multilayer which is useful for making flexible sachets welded by high frequency and comprising (i) a barrier film based on a mixture of polyamide and of polyolefin, and (ii), on at least one of its faces, a film based on a polymer of ethylene and of an unsaturated ester, which can be welded by high frequency.

This film is sufficiently permeable to oxygen that flexible sachets made of this film and containing bleach do not split. Another advantage of the invention is the barrier to fragrances; it is no longer necessary to place large amounts of fragrance in the product contained in the sachet in order to be certain to compensate for the losses during a storage which may last several months. The reason for this is that the Applicant has found that the barrier to fragrances of a mixture of polyamide and polyolefin is higher than the barrier of a polyamide/polyolefin bilayer.

Another advantage of the invention is the mechanical strength of the multilayer film and of the sachets thus formed. Another advantage of the film of the invention is its ease of recycling; indeed, during its manufacture and that of the sachets, there are inevitably scraps, and the Applicant has found that films based on a mixture of polyamide and polyolefin can be mixed with polyethylene to make blown films of polyethylene, whereas when films having a layer of polyamide and a layer of polyethylene are recycled in polyethylene, the film obtained is of poor quality.

As regards the polyamide of the barrier layer, any polyamide may be used.

The term polyamide is understood to refer to the condensation products:

- of one or more amino acids, such as aminocaproic acid, 7-aminoheptanoic acid, 11-aminoundecanoic acid and 12-aminododecanoic acid of one or more lactams such as caprolactam, oenantholactam and lauryllactam;
- of one or more salts or mixtures of diamines such as hexamethylenediamine, dodecamethylenediamine, meta-xylylenediamine, bis-p-aminocyclohexylmethane and trimethylhexamethylenediamine with diacids such as isophthalic acid, terephthalic acid, adipic acid, azelaic acid, suberic acid, sebacic acid and dodecanedicarboxylic acid;
- or mixtures of some of these monomers which lead to copolyamides, for example PA-6/12 obtained by condensation of caprolactam and lauryllactam.

Polyamide mixtures may be used. PA-6 (polycaprolactam) and PA-6,6 (polyhexamethyleneadipamide) are advantageously used.

The term polyolefins is understood to refer to polymers comprising olefin units such as, for example, ethylene, propylene, 1-butene, etc. units.

By way of example, mention may be made of:

polyethylene, polypropylene, copolymers of ethylene with alpha-olefins, it being possible for these products to be grafted with unsaturated carboxylic acid anhydrides such as maleic anhydride or unsaturated epoxides such a glycidyl methacrylate.

copolymers of ethylene with at least one product chosen from (i) unsaturated carboxylic acids, their salts and their esters, (ii) vinyl esters of saturated carboxylic acids, (iii) unsaturated dicarboxylic acids, their salts, their esters, their hemiesters and their anhydrides, and (iv) unsaturated epoxides.

These ethylene copolymers may be grafted with unsaturated dicarboxylic acid anhydrides or unsaturated epoxides.

styrene/ethylene-butene/styrene (SEBS) block copolymers which are optionally maleic-treated.

Mixtures of two or more of these polyolefins may be used.
The following are advantageously used:

polyethylene, copolymers of ethylene and of an alpha-olefin, copolymers of ethylene/an alkyl (meth)acrylate, copolymers of ethylene/an alkyl (meth)acrylate/maleic anhydride, the maleic anhydride being grafted or copolymerized, copolymers of ethylene/an alkyl (meth)acrylate/glycidyl methacrylate, the glycidyl methacrylate being grafted or copolymerized, polypropylene.

It is recommended, in order to facilitate the mixing of polyolefin and polyamide, and if the polyolefins have few or no functions which can facilitate the compatibilization, to add a compatibilizing agent.

The compatibilizing agent is a product which is known per se for compatibilizing polyamides and polyolefins.

Mention may be made, for example, of:

polyethylene, polypropylene, ethylene-propylene copolymers, ethylene-butene copolymers, all of these products being grafted with maleic anhydride or glycidyl methacrylate.

ethylene/alkyl (meth)acrylate/maleic anhydride copolymers, the maleic anhydride being grafted or copolymerized.

ethylene/vinyl acetate/maleic anhydride copolymers, with the maleic anhydride being grafted or copolymerized.

the above two copolymers in which the maleic anhydride is replaced with glycidyl methacrylate, ethylene/(meth)acrylic acid copolymers and optionally their salts, polyethylene, propylene or ethylene-propylene copolymers, these polymers being grafted with a product having a site which is reactive with amines; these grafted copolymers then being condensed with polyamides or polyamide oligomers having only one amine end.

These products are described in patents FR 2,291,225 and EP 342,066, the content of which is incorporated in the present application.

The mixture of polyamide and polyolefin of the barrier layer may contain polyethylene predominantly according to one form of the invention or may contain polyamide predominantly according to another form.

As regards this second form, the amount of polyamide forming the matrix in the barrier layer may be between 30 and 95 parts per 5 to 45 parts of polyolefins.

The amount of compatibilizing agent is the amount which is sufficient for the polyolefin to be dispersed in the form of nodules in the polyamide matrix. It may represent up to 20% of the weight of the polyolefin. These polymers of the barrier layer are manufactured by mixing together polyamide, polyolefin and optionally compatibilizing agents according to the usual techniques of mixing in the molten state (twin-screw, Buss, single-screw).

Advantageously, the barrier layer comprises a matrix of polyamide 6 (PA-6) or 66 (PA-6,6) in which either nodules of a mixture of low-density polyethylene and of copolymer of ethylene, of alkyl (meth)acrylate and of maleic anhydride or of glycidyl methacrylate, or nodules of polypropylene are dispersed.

Such products are described in patents U.S. Pat. No. 5,070,145 and EP 564,338.

In the case of polypropylene, a compatibilizing agent is added, which is advantageously an ethylene/propylene copolymer containing a predominant amount of propylene units by number, grafted with maleic anhydride and then subsequently condensed with monoamine oligomers of caprolactam.

These mixtures of polyamide and of polyolefin of the barrier layer may be plasticized and may optionally contain fillers such as carbon black, etc.

Such mixtures of polyamide and polyolefin are described in patent U.S. Pat. No. 5,342,886.

The amount of polyamide is between 30 and 75 parts per 100 parts of the polyamide/polyolefin mixture and preferably 50 to 75 parts.

By way of example, the following mixtures may be used (in % by weight):

1)—55 to 70% of PA-6.

5 to 15% of an ethylene-propylene copolymer containing a predominant amount of polypropylene grafted with maleic anhydride and then subsequently condensed with monoamine oligomers of caprolactam.

the remainder to 100% being polypropylene.

2)—55 to 70% of PA-6.

5 to 15% of at least one copolymer of ethylene with (i) an alkyl (meth)acrylate or a vinyl ester of unsaturated carboxylic acid and (ii) an unsaturated carboxylic acid anhydride or an unsaturated epoxide which is grafted or copolymerized.

the remainder being polyethylene.

3)—55 to 70% of PA-6.

5 to 15% of polyethylene or copolymers of ethylene and of an alpha-olefin grafted with maleic anhydride or glycidyl methacrylate.

the remainder being polyethylene.

As regards the copolymer of ethylene and of an unsaturated ester which can be welded by high frequency, the ester may be chosen from vinyl esters of saturated carboxylic acids having, for example, 2 to 6 carbon atoms, such as vinyl acetate or vinyl propionate, and from unsaturated carboxylic acid esters such as, for example, alkyl (meth)acrylates whose alkyl group has from 1 to 20 carbon atoms.

These copolymers of ethylene and of an unsaturated ester may also comprise:

monomers having:

carboxylic acid functions, such as (meth)acrylic acid, carboxylic acid salts such as ionomers, or carboxylic acid anhydrides such as maleic anhydride, or monomers having epoxy functions such as glycidyl (meth)acrylate;

it being possible for these monomers to be grafted or copolymerized.

The copolymers of the weldable layer may also be mutual mixtures and/or mixtures with polyolefins, polyethylenes or copolymers of ethylene and of alpha-olefin.

Advantageously, the copolymer (or the mixture) forming the weldable layer is such that it contains not more than 50% by weight of vinyl acetate and preferably between 12 and 30%.

Advantageously, the mixture of the weldable layer also contains slip agents in order to facilitate their extrusion and also their passage through the welding machines.

According to an advantageous form of the invention, the weldable film based on a copolymer of ethylene and of an unsaturated ester comprises a sufficient amount of at least one N,N'-ethylene-bisamide of formula:

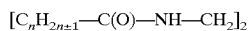

$[C_nH_{2n\pm1}-C(O)-NH-CH_2]_2$ in which n is an integer ranging from 17 to 21, in order to obtain an HF welding time of not more than one second and preferably between 0.2 and 0.5 second.

By way of illustration of N,N'-ethylene-bisamide which may be used according to the present invention, mention will be made of N,N'-ethylene-bisstearamide, N,N'-ethylenebisoleamide, N,N'-ethylenebisgadoleamide, N,N'-ethylenebiscetoleamide, N,N'-ethylenebiserucamide, and the mixture of at least two abovementioned N,N'-ethylenebisamides.

Among the N,N'-ethylenebisamides, the invention relates most particularly to N,N'-ethylenebisoleamide, referred to hereinbelow as EBO.

The welding time—which is less than or at most equal to 1 second—may be obtained by means of the use of a weight content of N,N'-ethylenebisamide of not more than 0.6%, and preferably between 0.3% and 0.5%, relative to the thermoplastic film.

According to a variant of the invention, the weldable film also comprises an antiblocking additive chosen from the group consisting of primary amides of fatty acid, silica, talc and a mixture of at least two of the abovementioned compounds.

By way of illustration of primary amide of saturated fatty acid, mention may be made of erucamide, oleamide, stearamide, palmitamide and a mixture of at least two of the abovementioned compounds.

Among these primary amides of fatty acid, it is preferred to use erucamide.

These antiblocking additives may be used in proportions not exceeding about 2% by weight relative to the weldable film.

This film may also contain at least one common additive such as:

- an additive for improving the slip nature such as, for example, a fatty acid metal salt (zinc stearate),
- an antioxidant, such as, for example, a sterically hindered phenol, a mercaptan or a phosphite,
- ultraviolet radiation absorbers such as substituted benzophenones, substituted phenylbenzotriazoles and sterically hindered amines; extinguishers such as nickel complexes, inorganic or organic pigment, such as zinc oxide or titanium oxide.

According to the present invention, the primary amides of saturated fatty acid and the additives mentioned above must be used in amounts such that they do not adversely affect the rate of weldability.

The thickness of the barrier film may be between 10 and 100 $\mu$m, preferably 20 to 40 $\mu$m. The thickness of the weldable film (that is to say the film based on a copolymer of ethylene and of an unsaturated ester) may be between 50 and 150 $\mu$m, preferably 60 to 100 $\mu$m. The multilayer film of the invention may be obtained by coextrusion according to the known techniques, such as cladding extrusion or sheet-die extrusion.

The present invention also relates to packaging comprising the above multilayer film which has been welded onto itself on the weldable film side.

Advantageously, the multilayer film of the invention also comprises a weldable film on the other face, that is to say that it comprises the barrier film between two films (or two layers) based on the copolymer of ethylene and of a weldable unsaturated ester.

According to a variant of the invention, a binder may be placed between the barrier layer and at least one of the weldable layers in order to improve the adhesion.

These coextrusion binders are known per se.

As examples of binders, mention may be made of:

polyethylene, polypropylene, copolymers of ethylene and of at least one alpha-olefin, and mixtures of these polymers, all of these polymers being grafted with unsaturated carboxylic acid anhydrides, such as, for example, maleic anhydride. Mixtures of these grafted polymers and of these ungrafted polymers may also be used.

copolymers of ethylene with at least one product chosen from (i) unsaturated carboxylic acids, their salts and their esters, (ii) vinyl esters of saturated carboxylic acids, (iii) unsaturated dicarboxylic acids, their salts, their esters, their hemiesters and their anhydrides, and (iv) unsaturated epoxides, it being possible for these copolymers to be grafted with unsaturated dicarboxylic acid anhydrides such as maleic anhydride or unsaturated epoxides such as glycidyl methacrylate.

A product which improves adhesion of the layers may also be added to one or to all of them without it being necessary to use a binder layer. This product may be the binder described above.

It would not constitute a departure from the scope of the invention to place other layers which may be made of polyamide, EVOH, etc. between the weldable layer(s) and the barrier layer.

The films of the present invention may be welded by a known method which consists in bringing at least two films between the optionally preheated plates of an HF welding press, in applying a pressure which depends on the thickness of the films to be welded and then, after having adjusted the oscillating circuit to obtain the maximum energy a current with a frequency equal to 27.12 MHz is applied to the layers maintained under pressure.

This current is maintained for a period—known as the welding time—which generally does not exceed 1 second, after which the welded films are optionally cooled before recovering them.

The tear strength is determined on the films obtained according to the standard 54120.

The films according to the present invention have the advantage of having a high tear strength even for very short welding times, of about 0.2 second.

These films can be used in particular for packaging maintenance products.

The packaging manufactured with these materials is of high strength in the compression test. This test consists in placing the package, filled with liquid and welded, on a flat surface and then in placing a plate loaded with a weight of 200 kg on top of the said package. The package should not produce any leaks.

EXAMPLES

The following materials are used:

EVA: denotes an ethylene-vinyl acetate copolymer containing 24% acetate and MFi 3 (190° C.—2.16 kg)

PA: denotes a polyamide 6 of MFi 2 (at 235° C.—2.16 kg)

PA1: denotes a mixture of polyamide 6, VLDPE (very low-density PE) and an ethylene/butyl acrylate/maleic anhydride copolymer (containing 6% acrylate and 3% maleic anhydride) in respective proportions of 65/25/10.

L1: denotes a polyethylene grafted with 0.2% MAH, of MFi 3–4

Example 1

A film 1: EVA/L1/PA/L1/EVA of thickness 80/10/100/10/80 (in $\mu$m) and a film 2: EVA/L1/PA1/L1/EVA of thickness 80/10/100/10/80 (in $\mu$m) were prepared by coextrusion on an ERWEPA 5-layer cast line. The permeabilities to water vapour were measured according to ASTM standard E96

Film 1: 20g/m$^2$/24h

Film 2: 14g/m$^2$/24h

Example 2

A film EVA/L1/PA1/L1/EVA of thickness 80/10/40/10/80, in $\mu$m, was prepared by coextrusion on an "ERWEPA" 5-layer cast line. The EVA is charged with:

3.6% TiO$_2$ 0.3% ethylenebisoleamide EBO 0.1% erucamide 250 ml sachets were welded from this film by HF at 27.12 MHz on a SERTIC machine.

The operation comprised:

manufacture of the sachet filling closure and cutting

The output of the machine is 40 to 45 sachets per minute.

The sachets all withstood compression tests greater than 200 daN.

The permeability to fragrances of this material was compared with an EVA/PE/EVA multilayer of thickness (in μm) 90/40/90 and a multilayer of the same nature but of thickness 50/80/90 in which PE denotes a radical-derived medium-density polyethylene of melt index 2.

Sachets were manufactured with multilayer materials according to the invention (Ex. 2) and according to the above two multilayers. They were filled with a textile softener containing 15 to 30% of cationic surfactants, preserving agents and an essence of lavender.

After 30 days, the sachets were cut and opened. Only the sachet of the invention contains a liquid having an odour, whereas in the other two liquids, the odour is considerably attenuated.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

I claim:

1. Multilayer film, which is useful for making flexible sachets, comprising (i) a barrier film of a mixture of polyamide and of polyolefin, and (ii), on at least one of its faces, a film of a copolymer of ethylene and of an unsaturated ester, which is high frequency weldable.

2. Multilayer film according to claim 1, wherein the polyamide of the barrier film is polyamide-6 or polyamide-6,6.

3. Multilayer film according to claim 1, wherein the copolymer of ethylene and of an unsaturated ester is an ethylene/vinyl acetate copolymer.

4. Packaging comprising the multilayer film of claim 1, which has been welded onto itself on the film side of the copolymer of ethylene and of unsaturated ester.

5. Multilayer film, which is useful for making flexible sachets, comprising (i) a barrier film of a mixture of polyamide and of polyolefin, and (ii), on at least one of its faces, a film of a copolymer of ethylene and of an unsaturated ester, which is high frequency weldable; the weldable film comprises a sufficient amount of at least one N,N'-ethylenebisamide of formula:

$[C_nH_{2n\pm1}$—$C(O)$—$NH$—$CH_2]_2$ in which n is an integer ranging from 17 to 21, to obtain an HF welding time of not more than one second.

6. Multilayer film according to claim 5, wherein the welding time is between 0.2 and 0.5 seconds.

* * * * *